(12) United States Patent
D'Amico et al.

(10) Patent No.: US 11,688,035 B2
(45) Date of Patent: Jun. 27, 2023

(54) SYSTEMS AND METHODS FOR CAPTURING USER CONSUMPTION OF INFORMATION

(71) Applicant: MetaConsumer, Inc., Redwood City, CA (US)

(72) Inventors: Nathaniel D'Amico, Redwood City, CA (US); Chandrasekhar Vijay Ramaseshan, Davis, CA (US)

(73) Assignee: MetaConsumer, Inc., Redwood City, CA (US)

( * ) Notice: Subject to any disclaimer, the term of this patent is extended or adjusted under 35 U.S.C. 154(b) by 0 days.

(21) Appl. No.: 17/721,186

(22) Filed: Apr. 14, 2022

(65) Prior Publication Data

US 2022/0335567 A1 Oct. 20, 2022

Related U.S. Application Data

(60) Provisional application No. 63/175,237, filed on Apr. 15, 2021.

(51) Int. Cl.
*G06T 3/40* (2006.01)
*H04N 1/00* (2006.01)

(52) U.S. Cl.
CPC ........... *G06T 3/40* (2013.01); *H04N 1/00244* (2013.01)

(58) Field of Classification Search
CPC .............................. G06T 3/40; H04N 1/00244
USPC ....................................................... 382/298
See application file for complete search history.

(56) References Cited

U.S. PATENT DOCUMENTS

| 7,483,892 | B1 | 1/2009 | Sommer et al. |
| 7,639,943 | B1* | 12/2009 | Kalajan ................. G03B 29/00 709/219 |
| 10,212,306 | B1 | 2/2019 | Goyal et al. |
| 10,685,224 | B1 | 6/2020 | Kekatpure |
| 11,115,625 | B1 | 9/2021 | Stuan et al. |
| 2002/0196986 | A1* | 12/2002 | McIntyre ........... H04N 1/00145 382/305 |
| 2005/0219406 | A1* | 10/2005 | Ohsawa ........... H04N 5/232411 348/E5.042 |
| 2006/0055808 | A1* | 3/2006 | Maeng ............. H04N 5/232941 386/E5.072 |

(Continued)

FOREIGN PATENT DOCUMENTS

| CN | 1930575 B | 5/2011 |
| CN | 107003720 A | 8/2017 |

(Continued)

*Primary Examiner* — Jerome Grant, II
(74) *Attorney, Agent, or Firm* — Sheppard, Mullin, Richter & Hampton LLP

(57) ABSTRACT

A client device assists in identifying user consumption of information. The client device comprises a hardware processor; a screen; memory storing computer instructions that when executed perform capturing a series of screen image snapshots being presented on the screen; reducing resolution of each screen image snapshot in the series of screen image snapshots; capturing metadata associated with each screen image snapshot in the series of screen image snapshots, the metadata at least including a timestamp; identifying a duplicate in the series of screen image snapshots; discarding the duplicate from the series of screen image snapshots; and uploading the series of captured screen image snapshots to a processing server for processing.

20 Claims, 7 Drawing Sheets

(56) References Cited

U.S. PATENT DOCUMENTS

| | | | |
|---|---|---|---|
| 2007/0250699 A1 | 10/2007 | Dube et al. | |
| 2009/0031425 A1 | 1/2009 | Basson et al. | |
| 2012/0192243 A1* | 7/2012 | Hall | H04N 21/43637 |
| | | | 725/118 |
| 2014/0219566 A1 | 8/2014 | Rodriguez et al. | |
| 2015/0341559 A1* | 11/2015 | Kelder | H04N 5/23219 |
| | | | 348/220.1 |
| 2016/0247015 A1 | 8/2016 | Lee et al. | |
| 2017/0279933 A1 | 9/2017 | Schurman et al. | |
| 2019/0251117 A1 | 8/2019 | Sharifi | |
| 2019/0354766 A1 | 11/2019 | Moore et al. | |
| 2019/0361694 A1 | 11/2019 | Gordon et al. | |
| 2020/0290089 A1* | 9/2020 | Blohm | G02B 27/0172 |

FOREIGN PATENT DOCUMENTS

| | | | | |
|---|---|---|---|---|
| JP | 2017529580 | * 10/2017 | | G06F 13/00 |
| KR | 20150098655 A | 8/2015 | | |
| KR | 20170016817 A | 2/2017 | | |
| KR | 20220102134 A | 7/2022 | | |
| WO | WO2018048356 | * 3/2018 | | G06F 17/30 |

\* cited by examiner

SYSTEMS AND METHODS FOR CAPTURING USER CONSUMPTION OF INFORMATION

PRIORITY CLAIM

This application claims benefit of and hereby incorporates by reference provisional patent application Ser. No. 63/175,237, entitled "MetaConsumer Adaptive Passive Monitoring Client," filed on Apr. 15, 2021, by inventors Nathaniel D'Amico and Chandrasekhar Vijay Ramaseshan.

TECHNICAL FIELD

This invention relates generally to computer systems, and more particularly provides systems and methods for capturing user consumption of information, such as advertisements and media content.

BACKGROUND

Media consumption and advertising has become ubiquitous across devices. It can be found on web pages, smart devices, televisions, streaming services, radio, etc. Accordingly, a mechanism for capturing user consumption of advertising, media and/or other information, would be helpful.

SUMMARY

Capturing content consumption by a user would be important to product and brand managers, media & data brokers, manufacturers, vendors, distributors, service providers, etc. The content consumption information can assist recipients with recognizing user behavior, preferences, user interests, and/or demographic/socio-economic information, which can be used to modify behaviors, e.g., with regard to targeted advertising, sales strategies, product/service development, resource allocation, etc. For example, information about how long a user consumes an advertisement on a car may indicate a possible interest in the purchase of a car, may inform a vendor to target the user for a car, may inform an advertisement provider of the effectiveness of the advertisement, etc. As another example, information on the type of music a user is consuming on a set top box may inform a different music service of recommendations for the user on its phone service.

In some embodiments, the present invention provides a client device configured to assist in identifying user consumption of information, the client device comprising one or more hardware processors; a screen; memory storing computer instructions, the computer instructions when executed by the one or more hardware processors configured to perform capturing a series of screen image snapshots being presented on the screen; reducing resolution of each screen image snapshot in the series of screen image snapshots; capturing metadata associated with each screen image snapshot in the series of screen image snapshots, the metadata at least including a timestamp; identifying a duplicate in the series of screen image snapshots; discarding the duplicate from the series of screen image snapshots; and transferring the series of captured screen image snapshots to a processing server for processing.

The client device may reduce the resolution to a predetermined resolution. The resolution may be based on available memory. The metadata may include information about a discarded duplicate. The instructions may be configured to perform capturing the series of screen image snapshots at a predetermined rate. The predetermined rate may be one screen image snapshot per second. The instructions may be configured to stop capturing screen image snapshots when a battery goes below a threshold battery level. The instructions may be configured to stop capturing screen image snapshots based on a threshold storage value. The instructions may be configured to stop capturing screen image snapshots when a user shuts it down. The instructions may be configured to stop capturing screen image snapshots when a screen is off. The instructions may be configured to stop capturing screen image snapshots when a keyboard is detected.

In some embodiment, the present invention may provide a processor-based method of capturing user consumption of information. The method comprises capturing a series of screen image snapshots being presented on a screen of a client device; reducing resolution of each screen image snapshot in the series of screen image snapshots; capturing metadata associated with each screen image snapshot in the series of screen image snapshots, the metadata at least including a timestamp; identifying a duplicate in the series of screen image snapshots; discarding the duplicate from the series of screen image snapshots; and uploading the series of captured screen image snapshots to a processing server for processing.

The resolution may be a predetermined resolution. The resolution may be based on available memory. The metadata may include information about a discarded duplicate. The capturing may include capturing the series of screen image snapshots at a predetermined rate. The predetermined rate may be one screen image snapshot per second. The method may further comprise stopping capturing screen image snapshots when a battery goes below a threshold battery level. The method may further comprise stopping capturing screen image snapshots based on a threshold storage value. The method may further comprise stopping capturing screen image snapshots when a user shuts it down. The method may further comprise stopping capturing screen image snapshots when a screen is off. The method may further comprise stopping capturing screen image snapshots when a keyboard is detected.

DETAILED DESCRIPTION

The following description is provided to enable a person skilled in the art to make and use various embodiments of the invention. Modifications are possible. The generic principles defined herein may be applied to the disclosed and other embodiments without departing from the spirit and scope of the invention. Thus, the claims are not intended to be limited to the embodiments disclosed, but are to be accorded the widest scope consistent with the principles, features and teachings herein.

Capturing content consumption by a user would be important to product and brand managers, media & data brokers, manufacturers, vendors, distributors, service providers, etc. The content consumption information can assist recipients with recognizing user preferences, user behaviors, interests, and/or demographic/socio-economic information, which can be used to modify behaviors, e.g., with regard to targeted advertising, sales strategies, product/service development, resource allocation, etc. For example, information about how long a user consumes an advertisement on a car may indicate a possible interest in the purchase of a car, may inform a vendor to target the user for a car, may inform an advertisement provider of the effectiveness of the advertisement, etc. As another example, information on the type of music a user is consuming on a set top box may inform a different music service of recommendations for the user on its phone service.

Figure 1:
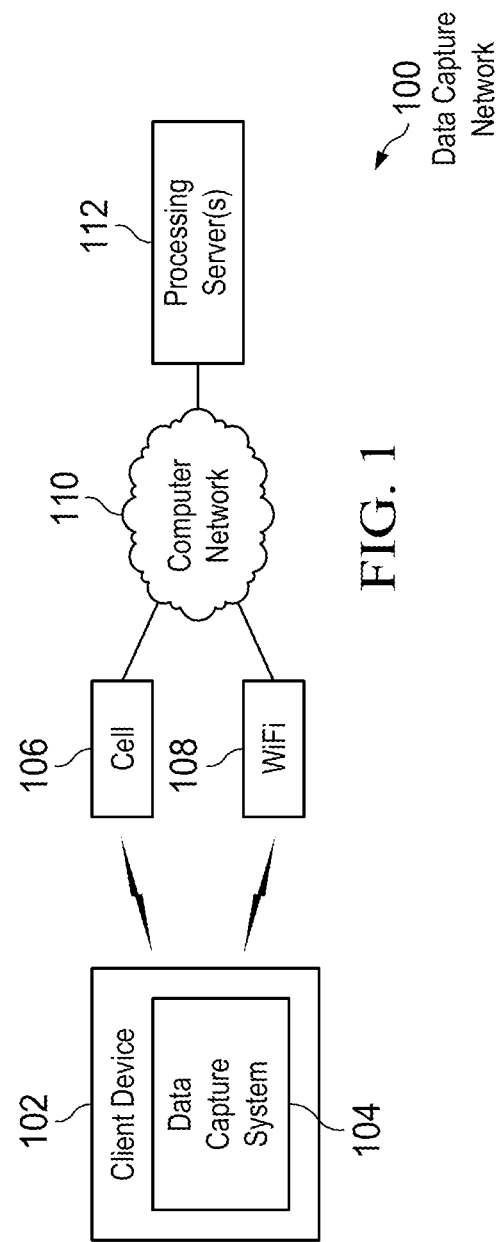
FIG. 1 is a block diagram of a data capture network, in accordance with some embodiments of the present invention.

FIG. 1 is a block diagram of a data capture network 100, in accordance with some embodiments of the present invention. The data capture network 100 includes a client device 102 coupled via a cellular channel 106 (e.g., AT&T, Verizon, T-Mobile, and/or the like) and/or a WiFi channel 108 (home WiFi, public WiFi and/or the like) to a computer network 110, which is connected to one or more processing servers 112. The client device 102 may be any smart device such as laptop, mobile phone, tablet, desktop computer, car entertainment/radio system, game console, smart television, set-top box, smart appliance or general edge-computing device. The client device 102 may belong to one of a number of subscribed users who are participating in a research program about the consumption of particular information, e.g., an advertising campaign for a product and/or service. The computer network 110 may include any wide area network, local area network, wireless area network, private network, public network and/or the particular wide area network commonly referred to as the Internet. The one or more processing servers may be one or more computer device capable of processing the information captured by the client device 102 (and other similar client devices of other users).

The client device 102 includes a data capture system 104. The data capture system 104 may include hardware, software and/or firmware configured to perform data collection in a passive and/or active data collection manner, which it optimizes and uploads to the one or more processing servers 112 for processing and analysis. In some embodiments, the data capture system 104 captures screen data, external audio data, and/or device metadata.

In some embodiments, the data capture system 104 performs screen image capture to capture a series of screen image snapshots (frames) on the client device 102. In some embodiments, the data capture system 104 may capture screen image snapshots, e.g., at a particular screen image capture rate, e.g., on a periodic (or other) basis. In some embodiments, the data capture system 104 may capture a screen image snapshot every second, every two seconds, every three seconds, or every n seconds. In some embodiments, the data capture system 104 can be configured via configuration settings to control the screen image capture rate. In some embodiments, the screen image capture rate is controllable only by administrators of the data capture service. In some embodiments, the screen image capture rate is controllable by the user of the client device 102. The one or more processing servers 112 may use the screen image snapshots to identify advertisements, pop-ups, topic information, length of time consuming information and/or other significant content being consumed on the client device 102.

The data capture system 104 may perform external audio capture to capture a series of external audio snapshots, e.g., using a microphone on the client device 102. In some embodiments, the data capture system 104 may capture external audio snapshots of a particular audio sampling size (e.g., one-second sample) at a particular audio sampling rate (e.g., every two second, every three seconds, or every n seconds. In some embodiments, the data capture system 104 can be configured via configuration settings to control the audio sampling size and/or audio sampling rate of external audio capture. In some embodiments, the audio sampling size and/or audio sampling rate is controllable only by administrators of the data capture service. In some embodiments, the audio sampling size and/or audio sampling rate of audio capture is controllable by the user of the client device 102. The one or more processing servers 112 may use the external audio snapshots to identify advertisements, commercials, topic information, length of time consuming information and/or other significant audio content being consumed (music, topic information, etc.), possibly via an external device such as a television or radio, or possibly on the client device 102 itself.

The data capture system 104 may perform a metadata capture process to capture metadata from the client device 102. The metadata may include client device information (e.g., remaining battery life, applications installed, storage resources, memory resources, processor (e.g., central processing unit, CPU) level, etc.), user behavior information (e.g., whether a call is in process, the currently active application, whether the screen is on or off, whether media is being consumed, URL information, device mode of operation (e.g., do-not-disturb mode), etc.), and/or ambient information (e.g., time stamps (e.g., time of day), geolocation, whether the client device connected to a WiFi channel 108, cellular channel 106 or disconnected, whether the client device 102 is plugged in, etc.). Some metadata is tied to snapshots (e.g., time stamps) and some metadata is tied to the client device 102 (e.g., battery level, geolocation).

Because the data captured may become quite voluminous and resource demanding and because client resources are typically scarce, the device capture system 104 may perform certain optimizations to preserve storage, preserve battery life, reduce transmission burden during data transfers, and reduce processing demands. In some embodiments, because of these optimizations, the device capture system 104 may run 24/7 passively in the background without the user knowing it is running and without any adverse effects while the user operates the client device 102 in a typical fashion.

Example optimizations performed by the data capture system 104 may include screen-capture optimizations, audio-capture optimizations, and metadata-capture optimizations. Screen capture optimizations may include screen resolution reduction, duplicate management, blacklist/whitelist management, keyboard detection, screen-off detection, and/or start/stop control. Example audio-capture optimizations may include audio resolution reduction, microphone monitoring, and/or start/stop control. Metadata capture optimization may include metadata resolution management. Further details of the optimizations is described herein, and particularly with reference to FIG. 3.

The data capture system 104 includes hardware, software and/or firmware to perform a data (asset) upload process to upload the screen data, external audio data and/or metadata to the one or more processing servers 112 for processing. Please note that the term "upload" is intended to include all forms of data transfer, whether pull-based, push-based, FTP, SFTP, etc. Notably, the data capture system 104 may conduct each of these upload events at the same or different upload times and/or upload rates. In some embodiments, the data capture system 104 may batch upload each of the screen data, external audio data and/or metadata based on satisfaction of different trigger conditions. The trigger condition may control uploading of each data set (each of the screen data, external audio data, and metadata) at different upload times and/or rates, the screen data and external audio at the same upload times and/or rates and the metadata at different upload times and/or rates, or all three data sets (the screen data, external audio data and metadata) at the same upload time and/or rate. In some embodiments, the trigger condition may occur periodically, a certain times of day, when the data captured reaches a particular size, when the data captured exceeds a certain percentage of available storage, when the client device 102 is connected to a WiFi channel 108, when the client device 102 is connected to an external power source, etc. In some embodiments, the trigger condition requires the client device 102 to be connected to a WiFi channel 108, and will not allow the data capture system 104 to upload data over a cellular channel 106. In some embodiments, the data capture system 104 enables the user to configure whether to allow data transfer over a cellular channel 106. In some embodiments, the data capture system 104 will allow metadata to be transferred over a cellular channel 106, while disallowing screen data and/or external audio data to be transferred over the cellular channel 106. In other words, in some embodiments, the data capture system 104 may allow an administrator and/or user to control which data set can be uploaded over cellular and/or WiFi.

In some embodiments, the one or more processing servers 112 may include and/or be resident on a cloud-based web service. In some embodiments, the one or more processing servers 112 may be on the client device 102, on other client devices 102, distributed across a plurality of client devices 102, distributed across one or more computing devices that include one or more client devices 102.

Figure 2:
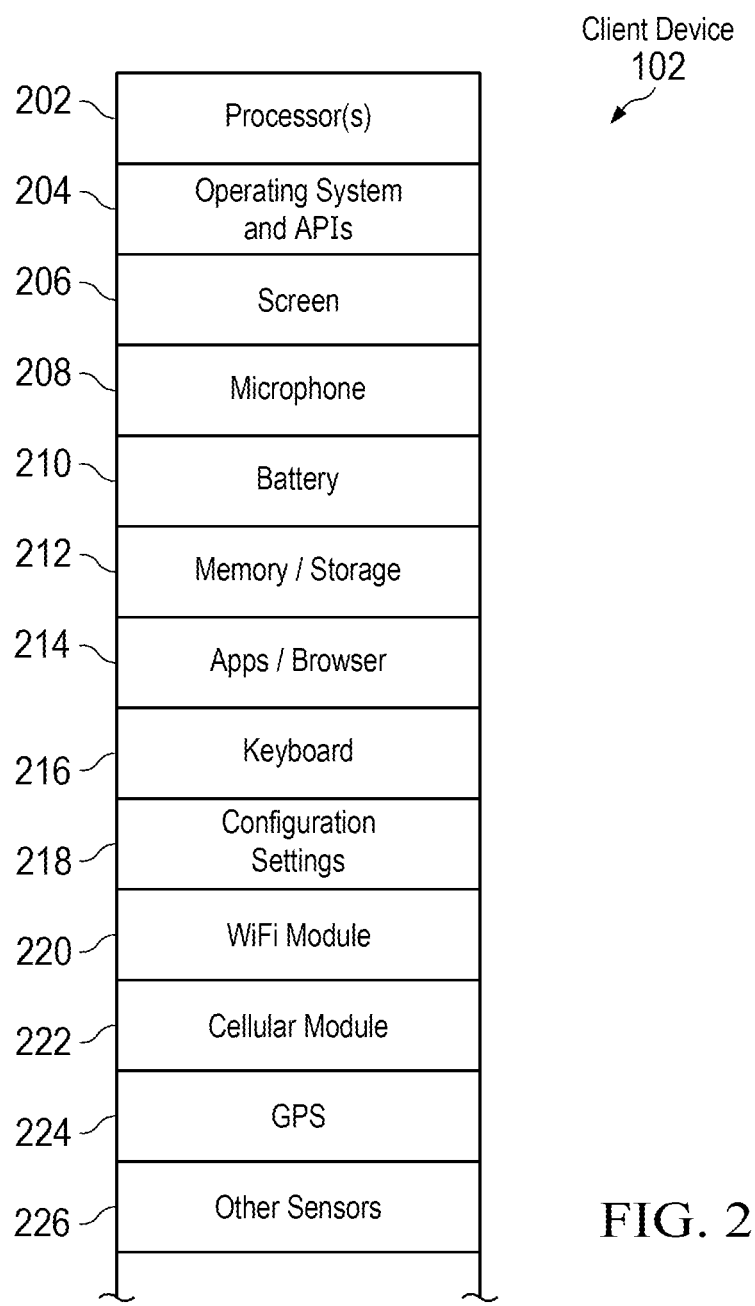
FIG. 2 is a block diagram of a client device, in accordance with some embodiments of the present invention.

FIG. 2 is a block diagram of a client device 102, in accordance with some embodiments of the present invention. As stated above, the client device 102 may be any smart device such as laptop, mobile phone, tablet, desktop computer, car entertainment/radio system, game console, smart television, set-top-box, smart appliance or general edge-computing device.

In some embodiments, the client device 102 includes one or more processors 202, an operating system and application program interfaces (APIs) 204, a screen 206, a microphone 208, a battery 210, memory/storage 212, resident applications including a browser 214, a keyboard 216, configuration settings 218, a WiFi module 220, a cellular module 222, a global positioning system (GPS) 224, and/or one or more other devices/sensors 226 (thermal sensors, accelerometers, light sensors, gyroscopes, front and/or rear cameras, radio frequency capture devices, AM/FM radios, storage expansion slots, device expansion slots, etc.).

The operating system and APIs 204 may be configured to permit the data capture system 104 to obtain information about and/or access to the other elements, e.g., information about the one or more processors 202, the image on the screen 206, sound captured by the microphone 208, information about the battery 210, information about and access to the memory/storage 212, information about the installed applications including the browser 214, information about and access to the keyboard 216, information about and access to the configuration settings 218, information about and access to the WiFi module 220, information about and access to the cellular module 222, information about and access to the global positioning system (GPS) 224, and/or information about and access to the one or more other devices/sensors 226 (thermal sensors, accelerometers, light sensors, gyroscopes, front and/or rear cameras, radio frequency capture devices, AM/FM radios, storage expansion slots, device expansion slots, etc.).

Note that the memory/storage 212 may include a storage slot for expanded storage. In some embodiments, the expanded storage may be treated differently than native storage by the data capture system 104.

Figure 3:
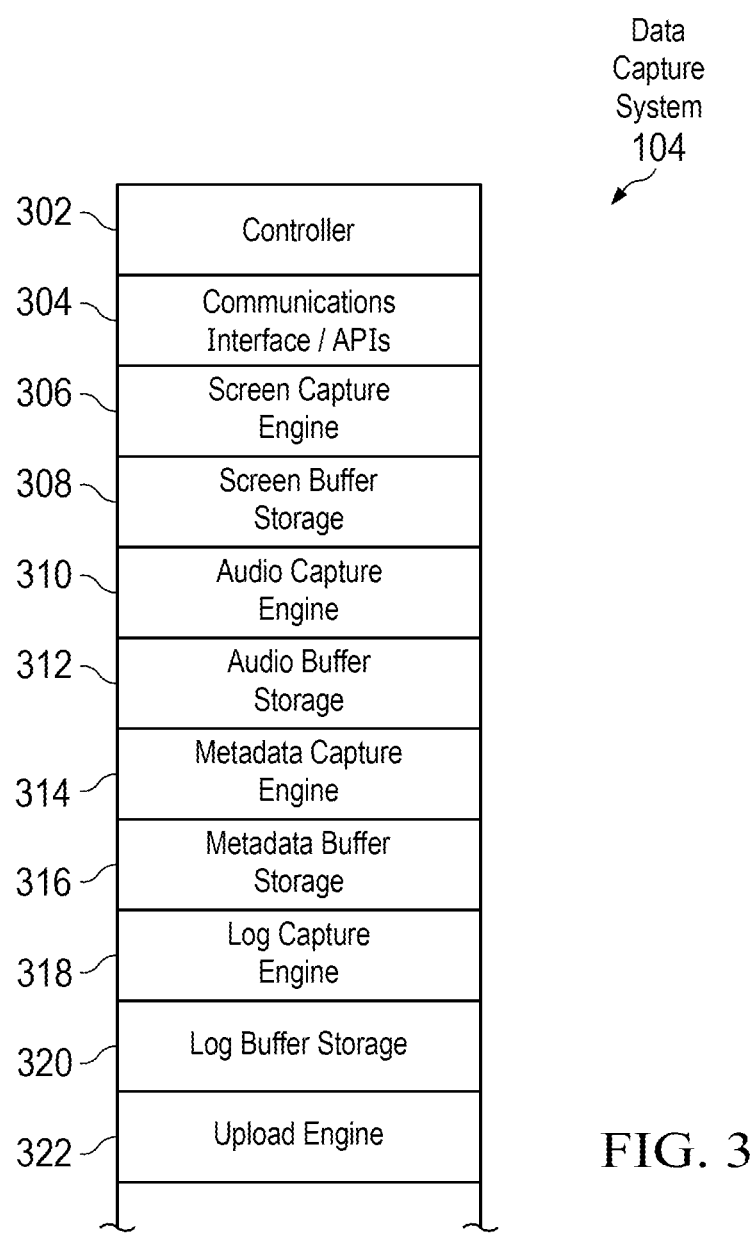
FIG. 3 is a block diagram of a data capture system, in accordance with some embodiments of the present invention.

FIG. 3 is a block diagram of a data capture system 104, in accordance with some embodiments of the present invention. The data capture system 104 includes a controller 302, a communications interface and APIs 304, a screen capture engine 306, screen buffer storage 308, an audio capture engine 310, audio buffer storage 312, a metadata capture engine 314, metadata buffer storage 316, a log capture engine 318, log buffer storage 320, and/or an upload engine 322.

The controller 302 includes hardware, software and/or firmware configured to control the process of the data capture system 104. The controller 302 is configured to manage general operations as well as monitor and manage the other services, such as data management services and notification services. The controller 302 is configured to manage configuration and state information, as well as establish channels to the components within itself, to running the data capture services, and to interactions with the end user. For example, the controller 302 may use the communications interface and APIs 304 to identify when storage is running low, to shut down data capture services that might be filling up storage, to notify the user when storage is getting low and when they should connect to the WiFi 108 to offload some of the captured data, to identify when the battery is running low, to shut down data capture services that might be draining the battery, to notify the user that due to low battery data capture services have been temporarily stopped until recharged, to identify the health of the client device 102 and data capture services, to detect the state of the device, available resources, permissions available and/or the like, to control restarting the data capture system 104 and/or individual data capture services, to prompt the user when permissions have changed or need to be refreshed, and/or to support certain optimizations as discussed below.

The communications interface and APIs 304 include hardware, software and/or firmware configured to enable the data capture system 104, e.g., the controller 302, the screen capture engine 306, the audio capture engine 310, the metadata capture engine 314, the log capture engine 318, and/or the upload engine 322, to communicate with the other components of the client device 102 and/or the one or more processing servers 112. For example, the communications interface and APIs 304 enable the data capture system 104 to communicate with the operating system and APIs 204 to enable the data capture system 104 to obtain information about or access to the other elements, e.g., information about the one or more processors 202, the image on the screen 206, sound captured by the microphone 208, information about the battery 210, information about and access to the memory/storage 212, information about the installed applications including the browser 214, information about and access to the keyboard 216, access to the configuration settings 218, information about and access to the WiFi module 220, information about and access to the cellular module 222, information about and access to the global positioning system (GPS) 224, and/or information about and access to the one or more other devices/sensors 226 (thermal sensors, accelerometers, light sensors, gyroscopes, front and/or rear cameras, radio frequency capture devices, AM/FM radios, storage expansion slots, device expansion slots, etc.). The controller 302 may cooperate with the operating system and APIs 304 to communicate with the elements of the client device 102 and with external elements such as the one or more processing servers 112.

User/Client Onboarding

When a user installs the data capture system 104 on a client device 102 and launches it for the first time, the controller 302 may be configured to perform an onboarding and setup process. The controller 302 may register the client device 102 and/or the user of the client device 102 with the one or more processing servers 112. The controller 302 may instruct the metadata capture engine 314 to capture metadata about the client device 102 and upload the metadata immediately. The controller 302 may register itself with an application program interface (API) on the one or more processing servers 112 for communications. The controller 302 may download configuration settings from the one or more processing servers 112 to configure the data capture system 104, e.g., to set screen capture rate, resolution requirements, audio snapshot sample size, audio snapshot sampling rate, upload rates and times, etc. The controller 302 may also manage encryption and/or authentication information to enable encrypted communications and authentication of the client device 102 and/or user with the one or more processing servers 112.

Further during the onboarding or setup process, the controller 302 may require the user to grant permissions, depending on the client device 102 and its operating system, to collect certain types of data or make local resources available on the client device 102. These permissions may include granting rights to access geolocation information, local storage, the screen image, external audio, local sensors (e.g., microphone, camera, etc.), configuration settings, operating system functions, processor performance information, battery level information, application process information, etc.

Client Configuration Updating

After client onboarding, and at various times, e.g., during re-authentication or status check-in process time, the controller 302 may register with the one or more processing servers 112 to obtain and update configuration parameters. These parameters may dictate behaviors of the data capture system 104, what time of day it collects data, at the frequency it collects data, and other parameters about how the data capture system 104 interacts with the communication interface and APIs 604 (discussed in FIG. 6) of the one or more processing servers 112. Some examples configuration parameters include data sampling rates and/or times for screen-capture data, external audio capture data and/or metadata. For example, the configuration parameters may include parameters that define how often to collect screen data, microphone data, other sensor data, geolocation information, available storage, available memory, remaining battery life, the list of applications installed on the client device 102, the running processor level, whether media is playing or not, available network connectivity (e.g., wifi versus cellular versus none), whether the screen is on or not, whether a call is happening or not, how much data the data capture system 104 has collected on the client device 102, etc.

The data capture system 104 may have default behaviors and values for the configuration parameters. Changes to these configuration parameters may occur in response to new updates, due to past behavior and usage by the user on the client device 102, due to information determined from the client device 102 such as processor type, device type, and/or the like.

The controller 302 may make the configuration settings available via a global store and/or common interface to the user and/or to a system administrator.

Screen Image Capture

The screen capture engine 306 may include hardware, software and/or firmware configured to use the communications interface and APIs 304 to capture screen information. In some embodiments, the screen capture engine 306 may capture a series of screen image snapshots, e.g., at a particular screen image capture rate, e.g., on a periodic (or other) basis. In some embodiments, the screen capture engine 306 may capture a screen image snapshot every second, every two seconds, every three seconds, or every n seconds. In some embodiments, the screen capture engine 306 may be configured via configuration settings to control the screen image capture rate. In some embodiments, the screen image capture rate is controllable only by administrators of the data capture service. In some embodiments, the screen image capture rate is controllable by the user of the client device 102. The screen capture engine 306 stores the screen capture information in the screen buffer storage 308, e.g., by placing each screen image snapshot into a respective buffer slot in the screen buffer storage 308.

The data capture system 104 may also perform screen-capture optimizations, which may include screen resolution reduction, duplicate management, blacklist/whitelist management, keyboard detection, screen-off detection and/or start/stop control. These screen-capture optimizations can be performed in order to preserve storage, prolong battery life, provide greater stability to general usage and operation of the client device 102. Some screen-capture optimizations may be performed by the controller 302 (e.g., when shutting down screen capture processes) and some screen-capture optimizations may be performed by the screen capture engine 305 (e.g., when modifying snapshots themselves), although one skilled in the art will recognize that the distinction is relatively loose and interchangeable. In some embodiments, the screen-capture optimizations may depend on the configuration and/or state of the client device 102. In some embodiments, the data capture engine 104 may perform the screen-capture optimizations "in-line", e.g., after screen image capture but before becoming persistently stored locally. In some embodiments, the data capture engine 104 may perform the screen-capture optimizations ad-hoc or after being persistently stored locally.

With screen resolution reduction, the screen capture engine 306 may reduce the screen resolution, e.g., in some embodiments, to a consistent 640×480 image regardless of the actual screen resolution (2k, 4k, 8k, etc.). In some embodiments, the screen capture engine 306 may reduce the screen resolution by a percentage, e.g., 50%, 60%, 70%, etc. In some embodiments, the screen capture engine 306 may reduce the screen resolution based on available memory/storage. In other words, on a client device 102 with significant memory/storage or available memory/storage, the screen capture engine 306 may reduce the image to a first resolution. On a client device 102 with less memory/storage or less available memory/storage, the screen capture engine 306 may reduce the image to a second, lower resolution. Depending on the screen size, supported resolution, etc., different screen capture engines 306 on different client devices 102 can provide smaller or larger screen buffer files for each image snapshot captured. In order to normalize across client devices 102, the screen capture engine 306 can down-sample ("resize") the screen resolution to meet the needs of the data capture engine 104, while still providing a proper asset for later accurate analysis. In some embodiments, the screen resolution is controllable only by administrators of the data capture service. In some embodiments, the screen resolution is controllable by the user of the client device 102.

With duplicate management, the screen capture engine 306 is configured to remove duplicate screen image snapshots. In some embodiments, the screen capture engine 306 stores consecutive screen image snapshots in different (e.g., logically consecutive) buffer storage slots in screen buffer storage 308. The screen capture engine 306 reviews the current screen image snapshot against the previous screen image snapshot to determine if it is identical or sufficiently similar (or insufficiently dissimilar) to the previous screen image snapshot. If identical or sufficiently similar, then in some embodiments the screen capture engine 306 discards (or truncates) the previous (or the current) screen image snapshot. The fact that the screen stayed the same or sufficiently similar in adjacent samples can be maintained in metadata. In some embodiments, the amount of similarity between subsequent screen image snapshots may be controlled based on based on configuration parameters. In some embodiments, the amount of similarity is controllable only by administrators of the data capture service. In some embodiments, the amount of similarity is controllable by the user of the client device 102.

With blacklist/whitelist management, the controller 302 or the screen capture engine 306 is configured to define which applications or URLs or other criteria are assigned to capture or not to capture screen image snapshots. As a whitelist example, the controller 302 or the screen capture engine 306 may be configured to capture screen image snapshots when the YouTube app is the active application. As a blacklist example, the controller 302 or the screen capture engine 306 may be configured to capture screen image snapshots at all times except when the Bank of America app is the active application. In an example where the controller 302 controls blacklist/whitelist management, the controller 302 determines the active application and instructs the screen capture engine 306 to capture or not to capture a screen image snapshot (or alternatively does not instruct the screen capture engine 306 to capture a screen image snapshot). In an example where the screen image capture engine 306 controls blacklist/whitelist management, the controller 302 informs the screen capture engine 306 of the active application and the screen capture engine 306 determines whether to capture or not to capture a screen image snapshot. In some embodiments, the blacklist and/or whitelist configuration is controlled by an administrator. In some embodiments, the blacklist and/or whitelist configuration is controlled by a user.

With keyboard detection, the controller 302 or the screen capture engine 306 is configured to stop screen image capture when the keyboard is active, e.g., so as not to inadvertently capture confidential information such as a password, birthday, social security number, etc. In an example where the controller 302 controls operations based on keyboard detection, the controller 302 determines whether the keyboard is active and instructs the screen capture engine 306 to capture or not to capture a screen image snapshot (or alternatively does not instruct the screen capture engine 306 to capture a screen image snapshot). In an example where the screen image capture engine 306 controls operations based on keyboard management, the controller 302 informs the screen capture engine 306 whether the keyboard is active and the screen capture engine 306 determines whether to capture or not to capture a screen image snapshot. In some embodiments, whether the keyboard being active shuts down the screen image capture is controllable only by administrators of the data capture service. In some embodiments, whether the keyboard being active shuts down the screen image capture is controllable by the user of the client device 102.

With screen-off detection, the controller 302 or the screen capture engine 306 is configured to stop screen image capture when the screen is off. In an example where the controller 302 controls operations based on screen-off detection, the controller 302 determines whether the screen is off and instructs the screen capture engine 306 to capture or not to capture a screen image snapshot (or alternatively does not instruct the screen capture engine 306 to capture a screen image snapshot). In an example where the screen image capture engine 306 controls operations based on screen-off detection, the controller 302 informs the screen capture engine 306 whether the screen is off and the screen capture engine 306 determines whether to capture or not to capture a screen image snapshot. In some embodiments, whether the screen being off shuts down the screen image capture is controllable only by administrators of the data capture service. In some embodiments, whether the screen being off shuts down the screen image capture is controllable by the user of the client device 102.

With start/stop control, the controller 302 or the screen capture engine 306 is configured to allow the user to control the on/off state of the screen image capture. The controller 302 or the screen capture engine 306 determines whether the user has activated or deactivated screen image capture and instructs the screen capture engine 306 to capture or not to capture a screen image snapshot (or alternatively does not instruct the screen capture engine 306 to capture a screen image snapshot) based on the user instructions.

In some embodiments, the controller 302 is configured to control stopping screen image capture based on the state of the client device 102, e.g., when storage is below a threshold amount, when storage is below a percentage of available storage, when the battery is below a certain percentage, when the one or more processors are being used at a great level to handle other system services (e.g., operating system updates, installing security systems, etc.).

External Audio Capture

The audio capture engine 310 may perform external audio capture to capture a series of external audio snapshots, e.g., using the communications interface and APIs 310 to access the microphone 208 on the client device 102. The external audio snapshots may be used to identify advertisements, commercials and/or other significant audio content (music, topic information, etc.), possibly being consumed via an external device such as a television or radio, or possibly being consumed on the client device 102 itself.

The data capture engine 104 may also perform audio-capture optimizations, which may include audio resolution reduction, microphone monitoring, and/or start/stop control. These audio-capture optimizations can be performed in order to preserve storage, prolong battery life, provide greater stability to general usage and operation of the client device 102. Some optimizations may be performed by the controller 302 (e.g., when shutting down audio-capture processes) and some optimizations may be performed by the audio capture engine 305 (e.g., when modifying audio snapshots themselves), although one skilled in the art will recognize that the distinction is relatively loose. In some embodiments, these optimizations may depend on the configuration and/or state of the client device 102. In some embodiments, the data capture engine 104 may perform these optimizations "in-line", e.g., after audio image capture but before becoming persistently stored locally. In some embodiments, the data capture engine 104 may perform these optimizations ad-hoc or after being persistently stored locally.

Different microphone may capture audio samples at different sampling rates. With audio resolution reduction, the audio capture engine 310 may down-sample external audio snapshots to a particular audio sampling size (e.g., one-second sample) at a particular audio sampling rate (e.g., every two second, every three seconds, or every n seconds. The audio capture engine 310 may store the down-sampled external audio snapshots in the audio buffer storage. In some embodiments, the data capture system 104 can be configured via configuration settings to control the audio sampling size and/or audio sampling rate of external audio capture. In some embodiments, the audio sampling size and/or audio sampling rate is controllable only by administrators of the data capture service. In some embodiments, the audio sampling size and/or audio sampling rate of audio capture is controllable by the user of the client device 102.

With microphone monitoring, the controller 302 or the audio capture engine 310 is configured to stop capturing external audio snapshots when the microphone is being used or has been requested by another component, e.g., for a phone call, voice-over-internet-protocol (VOIP) call, speech-to text control, voice control, etc. In an example where the controller 302 controls operations based on microphone detection, the controller 302 determines whether the microphone is in use or has been requested for use and instructs the audio capture engine 310 to capture or not to capture an external audio snapshot (or alternatively does not instruct the audio capture engine 310 to capture an external audio snapshot). In an example where the audio capture engine 310 controls operations based on microphone detection, the controller 302 informs the audio capture engine 310 whether the microphone is in use or has been requested for use and the audio capture engine 310 determines whether to capture or not to capture an external audio snapshot.

With start/stop control, the controller 302 or the audio capture engine 310 is configured to allow the user to control the on/off state of the external audio capture. The controller 302 or the audio capture engine 310 determines whether the user has activated or deactivates audio capture and instructs the audio capture engine 310 to capture or not to capture an external audio snapshot (or alternatively does not instruct the audio capture engine 310 to capture an external audio snapshot) based on the user instructions.

In some embodiments, the controller 302 is configured to control stopping external audio capture based on the state of the client device 102, e.g., when storage is below a threshold amount, when storage is below a percentage of available storage, when the battery is below a certain percentage, when the one or more processors are being used at a great level to handle other system services (e.g., operating system updates, installing security systems, etc.).

Corruption Control

In some embodiments, it has been found that operations avoid corruption when the data capture system 104 or individual components, such as the screen capture engine 306 and audio capture engine 310, are cycled (switched off and back on) periodically, e.g., every 15 minutes. Alternatively, the data capture system 104 or individual components may be cycles based on a different trigger condition, e.g., based on the file size. This apparently keeps things on the client device 102 in a "clean state" and avoids buffer corruption, which seems to occur when the service runs too long. This also reduces file size for the upload process, since the files will be segment into smaller, e.g., "15-minute", chunks.

In some embodiments, the data capture engine 104 or individual components, such as the screen capture engine 306 and audio capture engine 310, are configured to truncate capture buffers into smaller persisted file fragments to avoid buffer corruption. In some embodiments, the data capture system 104 can be configured via configuration settings to control the segment size and/or trigger condition. In some embodiments, the segment size and/or trigger condition is controllable only by administrators of the data capture service. In some embodiments, the segment size and/or trigger condition is controllable by the user of the client device 102.

Metadata Collection

The metadata capture engine 314 includes hardware, software and/or firmware configured to perform a metadata capture process to capture metadata from the client device 102. The metadata capture engine 314 stores the captured metadata in the metadata buffer storage 316, possibly in structured form or schema driven flat files. The metadata may include client device information (e.g., remaining battery life, applications installed, storage resources, memory resources, processor (e.g., central processing unit, CPU) level, etc.), user behavior information (e.g., whether a call is in process, the currently active application, whether the screen is on or off, whether media is being consumed, URL information, device mode of operation (e.g., do-not-disturb mode), etc.), and/or ambient information (e.g., timestamps, geolocation, whether the client device connected to a WiFi channel 108, cellular channel 106 or disconnected, whether the client device 102 is plugged in, etc.).

The metadata capture engine 312 may capture the metadata based on the configuration parameters that define sampling rates and sampling times for each metadata item. Sampling rate may indicate the frequency of sampling the information. Sampling time may indicate whether the samples are taken at the same time or at different times. For example, the configuration settings may indicate to sample two different pieces of metadata every five seconds and to collect them at the same time. For another example, the configuration settings may indicate to sample two different pieces of metadata every five seconds but not necessarily to collect them at the same time. For yet another example, the configuration settings may indicate to sample two different pieces of metadata at different rates and possibly to collect them at different times.

As indicated above, some metadata is tied to snapshots, and therefore will be captured and associated with each snapshot. For example, metadata tied to snapshots may include URL information and/or timestamps. Some metadata is tied to the client device 102, and therefore need not be captured with each snapshot.

Metadata Optimizations

Metadata capture optimization may include metadata resolution management. The metadata capture engine 314 may sample different metadata at different sampling rates. For example, the metadata capture engine 314 may capture predictably fast-changing variables more often and predicably slow-changing variables less often. Alternatively and/or additionally, the metadata capture engine 314 may capture predictably more storage- or CPU-demanding variables less often and predicably lower storage- or CPU-demanding variables more often. For example, the metadata capture engine 314 may capture geolocation, battery life, available storage, and installed applications a low frequency. The metadata capture engine 314 may capture the active/foreground application, whether the screen is on or off, whether the user is on or receiving a call, discarded screen image snapshots, and whether the keyboard is active or not at a high frequency (higher than the low frequency). Notably, the frequency of each metadata type may be controlled such that each metadata type may have a different frequency or such there can be any number of frequency groups to which the various metadata types belong.

Log Status Synchronization

The log capture engine 318 may include hardware, software and/or firmware configured to capture status information (e.g., how much data has been captured, how much of each data type (screen image snapshots, external audio snapshots, metadata snapshots, etc.) has been captured, crash reports, etc.). The log capture engine 318 stores the status information in the log buffer storage 320. Upon the satisfaction of a trigger condition, e.g., periodically, at various times, etc., the log capture engine 318 may take inventory of "log records" of the amount of data, e.g., screen image snapshots, external audio snapshots, metadata, captured and not yet synchronized. Log status information may be uploaded separately or with other data types, at the same or at different times, over the same or different channels, at the same or different frequency than metadata. In some embodiments, the log capture engine 318 can be configured via configuration settings to control the trigger condition. In some embodiments, the trigger condition is controllable only by administrators of the data capture service. In some embodiments, the trigger condition is controllable by the user of the client device 102.

Upon successful synchronization, log capture engine 318 record the state of events. Captured log information can persist in the log buffer storage 320 and/or be truncated based on storage needs and/or configuration parameters.

Upload Service

The upload engine 322 includes hardware, software and/ or firmware to perform a data (asset) upload process to upload the screen data, external audio data and/or metadata to the one or more processing servers 112 for processing. These assets are typically, but not limited to images and audio files, schema'd flat files (e.g., JSON formatted data files), and other. Notably, the upload engine 322 may conduct each of these upload processes over the same or separate batch upload times and/or upload rates. In some embodiments, the upload engine 322 may upload each of the screen data, external audio data and/or metadata based on satisfaction of different trigger conditions. The trigger condition may control uploading of each data set (each of the screen data, external audio data, and metadata) at different times and/or rates, the screen data and external audio at the same times and/or rates and the metadata at different times and/or rates, or all three data sets (the screen data, external audio data and metadata) at the same time and/or rate. In some embodiments, the trigger condition may occur periodically, a certain times of day, when the data captured reaches a particular size, when the data captured exceeds a certain percentage of available storage, when connected to a WiFi channel 108, etc. In some embodiments, the trigger condition requires the client device 102 to be connected to a WiFi channel 108, and will not allow the upload engine 322 to upload data over a cellular channel 106. In some embodiments, the upload engine 322 enables the user to configure whether to allow data transfer over a cellular channel 106. In some embodiments, the upload engine 322 will allow metadata to be transferred over a cellular channel 106, while disallowing screen data and/or external audio data to be transferred over the cellular channel 106. In other words, in some embodiments, the upload engine 322 may allow an administrator and/or user to control which data set can be uploaded over cellular and/or WiFi.

A typical upload process includes:

Gather metadata and other about local storage state.

Submit to a communications interface and APIs of the one or more processing servers 112 the metadata and log records.

Request permission from the one or more processing servers 112 to upload, which if granted the one or more processing servers 112 will provide an authenticated channel.

Persist the "asset bundle" and data to the one or more processing servers 112.

Upon successful completion flag data as synchronized.

Optional inline or future step to truncate data on the client device 102 based on configuration and local client device 102 needs.

In some embodiments, the upload engine 320 can be configured via configuration settings to control the upload times and/or upload rates. In some embodiments, the upload times and/or upload rates are controllable only by administrators of the data capture service. In some embodiments, the upload times and/or upload rates are controllable by the user of the client device 102.

Upload Optimizations

Depending on the configuration and/or state of the client device 102, some upload optimizations may include uploading only when the internet is accessible via a WiFi channel 108, because WiFi typically has reduced battery consumption, increased bandwidth available, and costs less to the user. Upload optimizations may include determining when storage on the device is getting full and/or the number of files has reached a threshold number, and therefore storage space may be needed. Upload optimization may include uploading oldest assets first. Upload optimizations may include to upload at preferred times, such as when the device is idle, the device is plugged in, the battery is above a certain percentage, the device is likely to be idle such as in the middle of the night, etc. Upload optimization may also include selecting a predetermined the number of files to bundle at a given upload instance. The upload optimization may define the "max bundle size" or "max bundle duration" (e.g., the oldest and newest assets in the bundle differ by less than X hours).

In some embodiments, the upload engine 320 can be configured via configuration settings to control the upload optimizations. In some embodiments, one, some or all of the upload optimizations are controllable only by administrators of the data capture service. In some embodiments, one, some or all of the upload optimizations are controllable by the user of the client device 102.

Data Management Services

In some embodiments, for storage optimization, the controller 302 detects the available storage on the "main disk" and the existence extended storage (e.g., secure-digital (SD) card). If extended storage is available, the controller 302 may use the most opportunistic storage available based on which one has the most space for screen buffer storage 308, audio buffer storage 312, metadata buffer storage 316, and/or log buffer storage 320. Notably, each of these different data types may use different storage. In some embodiments, as the environment changes, the controller 302 may adaptively shift its storage usage and location.

In some embodiments, the controller 302 may run different services in isolation or in concert. The controller 302 may initiate a health check upon start-up to ensure operations are functioning correctly.

Figure 4:
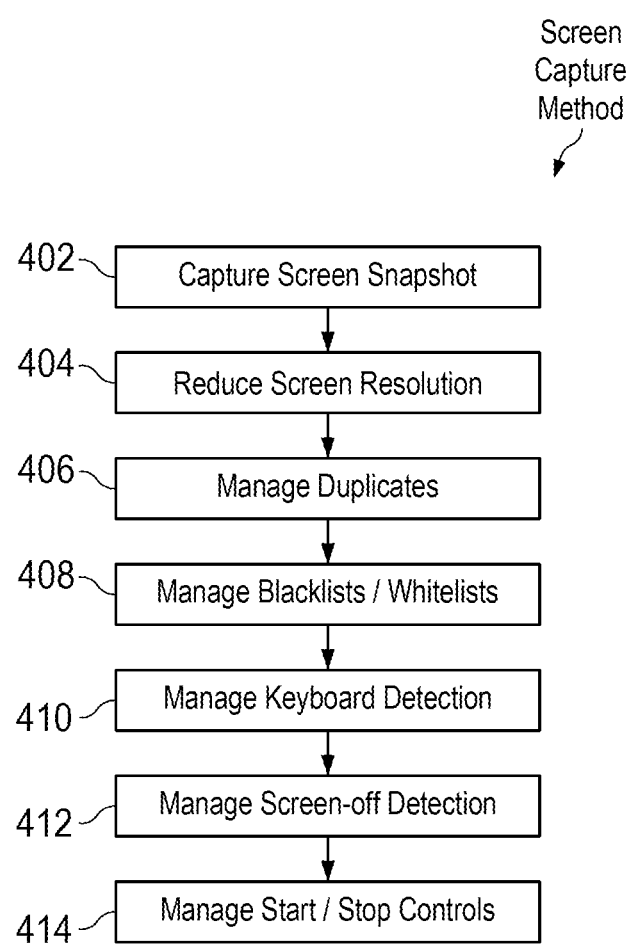
FIG. 4 is a flowchart of a method of screen capture, in accordance with some embodiments of the present invention.

FIG. 4 is a flowchart of a method 400 of screen capture, in accordance with some embodiments of the present invention. Method 400 begins in step 402 with the screen capture engine 306 capturing a screen image snapshot. In some embodiments, the screen capture engine 306 captures screen image snapshots, e.g., at a particular screen image capture rate, e.g., on a periodic (or other) basis. In some embodiments, the screen capture engine 306 captures a screen image snapshot every second, every two seconds, every three seconds, or every n seconds. In some embodiments, the screen capture engine 306 may be configured via configuration settings to control the screen image capture rate. The screen capture engine 306 stores the screen capture information in the screen buffer storage 308, e.g., by placing each screen image snapshot into a respective buffer slot in the screen buffer storage 308.

In step 404, the screen capture engine 306 reduces screen image resolution. In some embodiments, the screen capture engine 306 reduces the screen resolution to a consistent 640×480 image regardless of the actual screen resolution (2k, 4k, 8k, etc.), by a percentage, e.g., 50%, 60%, 70%, or the like. In some embodiments, the screen capture engine 306 reduces the screen resolution based on available memory/storage.

In step 406, the screen capture engine 306 manages duplicates. In some embodiments, the screen capture engine 306 stores consecutive screen image snapshots in different (e.g., logically consecutive) buffer storage slots in screen buffer storage 308. The screen capture engine 306 reviews the current screen image snapshot against the previous screen image snapshot to determine if it is identical or sufficiently similar (or insufficiently dissimilar) to the previous screen image snapshot. If identical or sufficiently similar, then in some embodiments the screen capture engine 306 discards (or truncates) the previous (or the current) screen image snapshot. The fact that the screen stayed the same or sufficiently similar in adjacent samples can be maintained in metadata. In some embodiments, the amount of similarity between subsequent screen image snapshots may be controlled based on based on configuration parameters.

In step 408, the controller 302 or the screen capture engine 306 manages blacklists and/or whitelists. In some embodiments, the controller 302 or the screen capture engine 306 may define which applications or URLs or other criteria are assigned to capture or not to capture screen image snapshots. In an example where the controller 302 controls blacklist/whitelist management, the controller 302 determines the active application and instructs the screen capture engine 306 to capture or not to capture a screen image snapshot (or alternatively does not instruct the screen capture engine 306 to capture a screen image snapshot). In an example where the screen image capture engine 306 controls blacklist/whitelist management, the controller 302 informs the screen capture engine 306 of the active application and the screen capture engine 306 determines whether to capture or not to capture a screen image snapshot.

In step 410, the controller 302 or the screen capture engine 306 manages keyboard detection. In some embodiments, the controller 302 or the screen capture engine 306 stops screen image capture when the keyboard is active, e.g., so as not to inadvertently capture confidential information such as a password, birthday, social security number, etc. In an example where the controller 302 controls operations based on keyboard detection, the controller 302 determines whether the keyboard is active and instructs the screen capture engine 306 to capture or not to capture a screen image snapshot (or alternatively does not instruct the screen capture engine 306 to capture a screen image snapshot). In an example where the screen image capture engine 306 controls operations based on keyboard management, the controller 302 informs the screen capture engine 306 whether the keyboard is active and the screen capture engine 306 determines whether to capture or not to capture a screen image snapshot.

In step 412, the controller 302 or the screen capture engine 306 manages screen-off detection. In some embodiments, the controller 302 or the screen capture engine 306 stops screen image capture when the screen is off. In an example where the controller 302 controls operations based on screen-off detection, the controller 302 determines whether the screen is off and instructs the screen capture engine 306 to capture or not to capture a screen image snapshot (or alternatively does not instruct the screen capture engine 306 to capture a screen image snapshot). In an example where the screen image capture engine 306 controls operations based on screen-off detection, the controller 302 informs the screen capture engine 306 whether the screen is off and the screen capture engine 306 determines whether to capture or not to capture a screen image snapshot.

In step 414, the screen capture engine 306 manages start/stop controls. In some embodiments, the controller 302 or the screen capture engine 306 allows the user to control the on/off state of the screen image capture. The controller 302 or the screen capture engine 306 determines whether the user has activated or deactivated screen image capture and instructs the screen capture engine 306 to capture or not to capture a screen image snapshot (or alternatively does not instruct the screen capture engine 306 to capture a screen image snapshot) based on the user instructions.

Figure 5:
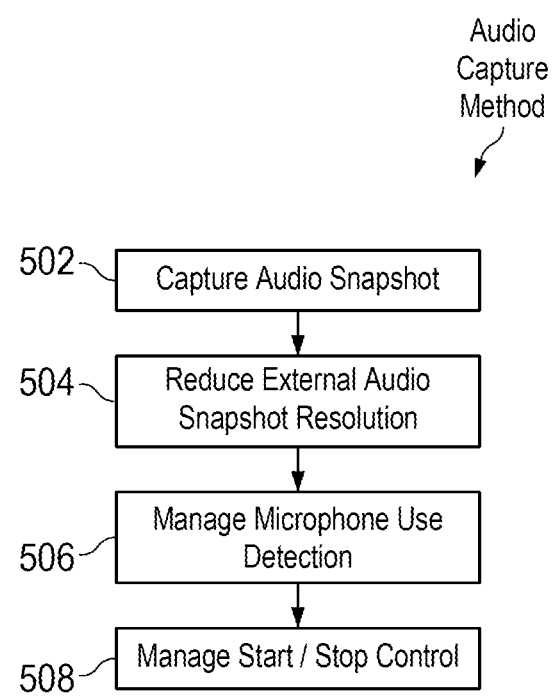
FIG. 5 is a flowchart of a method of audio capture, in accordance with some embodiments of the present invention.

FIG. 5 is a flowchart of a method 500 of audio capture, in accordance with some embodiments of the present invention.

The method 500 begins in step 502 with the audio capture engine 310 capturing an external audio snapshot. In some embodiments, the audio capture engine 310 performs external audio capture to capture external audio snapshots, e.g., using the communications interface and APIs 310 to access the microphone 208 on the client device 102.

In step 504, the audio capture engine 310 reduces the external audio snapshot resolution. In some embodiments, the audio capture engine 310 may down-sample external audio snapshots to a particular audio sampling size (e.g., one-second sample) at a particular audio sampling rate (e.g., every two second, every three seconds, or every n seconds. The audio capture engine 310 may store the down-sampled external audio snapshots in the audio buffer storage. In some embodiments, the data capture system 104 can be configured via configuration settings to control the audio sampling size and/or audio sampling rate of external audio capture In step 506, the controller 302 or the audio capture engine 310 manages microphone use detection. In some embodiments, the controller 302 or the audio capture engine 310 is configured to stop capturing external audio snapshots when the microphone is being used or has been requested by another component, e.g., for a phone call, voice-over-internet-protocol (VOIP) call, speech-to text control, voice control, etc. In an example where the controller 302 controls operations based on microphone detection, the controller 302 determines whether the microphone is in use or has been requested for use and instructs the audio capture engine 310 to capture or not to capture an external audio snapshot (or alternatively does not instruct the audio capture engine 310 to capture an external audio snapshot). In an example where the audio capture engine 310 controls operations based on microphone detection, the controller 302 informs the audio capture engine 310 whether the microphone is in use or has been requested for use and the audio capture engine 310 determines whether to capture or not to capture an external audio snapshot.

In step 508, the controller 302 or the audio capture engine 310 manages start/stop control. In some embodiments, the controller 302 or the audio capture engine 310 is configured to allow the user to control the on/off state of the external audio capture. The controller 302 or the audio capture engine 310 determines whether the user has activated or deactivates audio capture and instructs the audio capture engine 310 to capture or not to capture an external audio snapshot (or alternatively does not instruct the audio capture engine 310 to capture an external audio snapshot) based on the user instructions.

Figure 6:
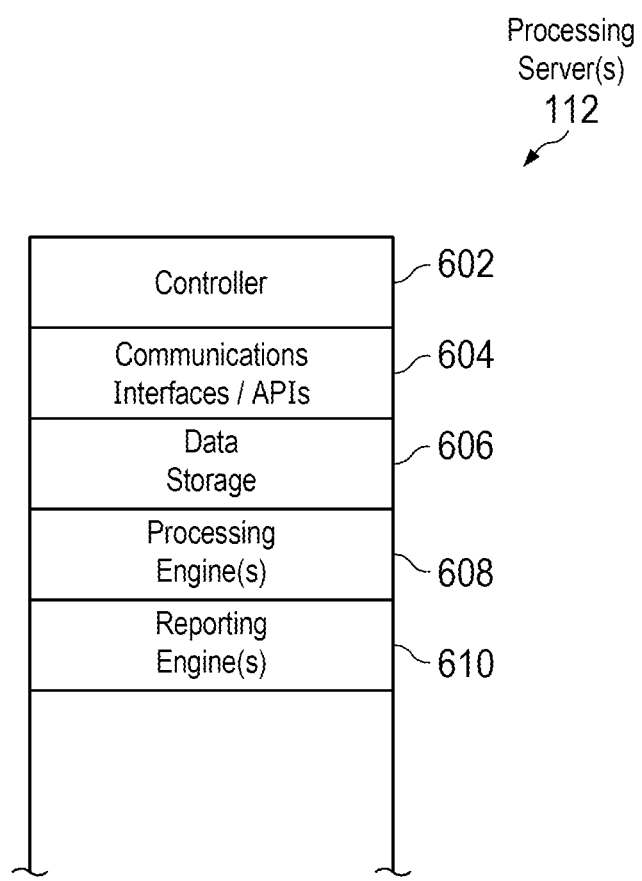
FIG. 6 is a block diagram of a processing server, in accordance with some embodiments of the present invention.

FIG. 6 is a block diagram of the one or more processing servers 112, in accordance with some embodiments of the present invention. The one or more processing server 112 includes a controller 602, a communications interface and APIs 604, data storage 606, one or more processing engines 608 and/or one or more reporting engines.

The controller 602 includes hardware, software and/or firmware configured to control the process of the one or more processing servers 112. The controller 602 is configured to manage general operations as well as monitor and manage the other services, such as data processing services and notification services. The controller 602 is configured to manage configuration and state information, as well as establish channels to the components within itself, to running the data processing services, and to interactions with various users. For example, the controller 602 may use the communications interface and APIs 604 to receive batch uploads from the client device 102, to use the data storage 606 to store the batch uploads, to use the one or more processing engines 608 to process the data within the batch uploads to identify instances of information consumption, e.g., consumption of advertisements, and to use the one or more reporting engines 610 to report its findings to various users, e.g., advertisers, subscribers, vendors, etc.

The communications interface and APIs 604 include hardware, software and/or firmware configured to enable the one or more processing servers 112, e.g., the controller 602, one or more processing engines 608 and/or one or more reporting engines 610, to communicate with the other components of the one or more processing servers 112 and/or the client device 102.

The controller 602 may be configured to assist with the onboarding and setup process. The controller 602 may register the client device 102 and/or the user of the client device 102. The controller 602 may instruct the data capture system 104 to capture metadata about the client device 102 and upload the metadata immediately. The controller 602 may register the communications interface and APIs 304 on the client device 102. The controller 602 may provide configuration settings to configure the data capture system 104, e.g., to set screen capture rate, resolution requirements, audio snapshot sample size, audio snapshot sampling rate, upload rates and times, etc. The controller 602 may also manage encryption and/or authentication information to enable encrypted communications and authentication with the client device 102.

After client onboarding, and at various times, e.g., during re-authentication or status check-in process time, the controller 602 may provide updated configuration parameters. These parameters may dictate behaviors of the data capture system 104, what time of day it collects data, at the frequency it collects data, and other parameters about how the data capture system 104 interacts with the communication interface and APIs 304 of the client device 102. Some examples configuration parameters include data sampling rates and/or times for screen-capture data, external audio capture data and/or metadata. For example, the configuration parameters may include parameters that define how often to collect screen data, microphone data, other sensor data, geolocation information, available storage, available memory, remaining battery life, the list of applications installed on the client device 102, the running processor level, whether media is playing or not, available network connectivity (e.g., wifi versus cellular versus none), whether the screen is on or not, whether a call is happening or not, how much data the data capture system 104 has collected on the client device 102, etc.

The data capture system 104 may have default behaviors and values for the configuration parameters. Changes to these configuration parameters may occur in response to new updates, due to past behavior and usage by the user on the client device 102, due to information determined from the client device 102 such as processor type, device type, and/or the like.

The one or more processing engines 608 may include hardware, software and/or firmware configured to process the data within the batch uploads to identify instances of information consumption, e.g., consumption of advertisements. In some embodiments, the one or more processing engines 608 may search the screen image snapshots to identify instances of a pop-up advertisement or other image on the screen 206 of the client device 102 and to determine the amount of time that the image was on the screen 206 and thus likely consumed by the user. The amount of time may be determined using the metadata, e.g., timestamps. The one or more processing engines 608 may search the external audio snapshots for particular audio consumption. In some embodiments, the one or more processing engines 608 may use acoustic fingerprints (similar to apps like Shazam) to identify advertisements and/or other content. The system can use voice fingerprints, frequency information, spectrograms, pulse code modulation, etc.

The one or more reporting engines 610 may include hardware, software and/or firmware configured to generate reports that identify the information consumption data (whether about a single end user, a group of end users, a demographic of end users, all end users, etc.). The one or more reporting engines 610 pay provide these reports to various users, e.g., advertisers, brands, corporations, manufacturers, vendors, distributers, and/or the like.

Figure 7:
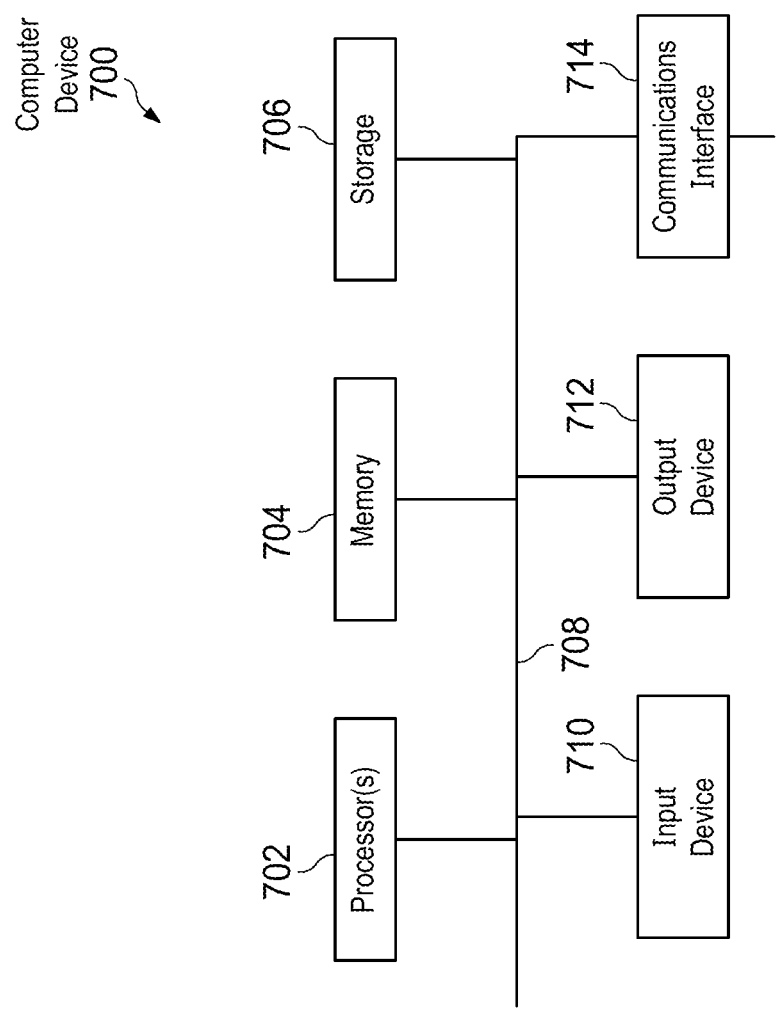
FIG. 7 is a block diagram illustrating details of a computer system, in accordance with some embodiments of the present invention.

FIG. 7 is a block diagram of a computing device 700, in accordance with some embodiments. In some embodiments, the computing device 700 may be a particular implementation of the client device 102 and/or of the one or more of the processing servers 112, and may perform some or all of the functionality described herein. The computing device 700 comprises one or more hardware processor 702, memory 704, storage 706, an input device 710, and output device 712 and/or a communications interface 714, all communicatively coupled to a communication channel 708.

The one or more hardware processors 702 may be configured to execute executable instructions (e.g., software programs, applications,). In some example embodiments, the one or more hardware processors 702 comprises circuitry or any processor capable of processing the executable instructions.

The memory 704 stores working data. The memory 704 any include devices, such as RAM, ROM, RAM cache, virtual memory, etc. In some embodiments, the data within the memory 704 may be cleared or ultimately transferred to the storage 706 for more persistent retention. The term "memory" herein is intended to cover all data storage media whether permanent or temporary.

The storage 706 includes any persistent storage device. The storage 706 may include flash drives, hard drives, optical drives, cloud storage, magnetic tape and/or extensible storage devices (e.g., SD cards). Each of the memory 704 and the storage 706 may comprise a computer-readable medium, which stores instructions or programs executable by one or more hardware processors 702.

The input device 710 may include any device capable of receiving input information (e.g., a mouse, keyboard, microphone, etc.). The output device 712 includes any device capable of outputting information (e.g., speakers, screen, etc.).

The communications interface 714 may include any device capable of interfacing with external devices and/or data sources. The communications interface 714 may include an Ethernet connection, a serial connection, a parallel connection, and/or an ATA connection. The communications interface 714 may include wireless communication (e.g., 802.11, WiMax, LTE, 5G, WiFi) and/or a cellular connection. The communications interface 714 may support wired and wireless standards.

A computing device 700 may comprise more or less hardware, software and/or firmware components than those depicted (e.g., drivers, operating systems, touch screens, biometric analyzers, battery, APIs, global positioning systems (GPS) devices, various sensors and/or the like). Hardware elements may share functionality and still be within various embodiments described herein. In one example, the one or more hardware processors 702 may include a graphics processor and/or other processors.

An "engine," "system," "datastore," and/or "database" may comprise hardware, software, firmware, and/or circuitry. In one example, one or more software programs comprising instructions capable of being executable by a hardware processor may perform one or more of the functions of the engines, datastores, databases, or systems described herein. Circuitry may perform the same or similar functions. The functionality of the various systems, engines, datastores, and/or databases may be combined or divided differently. Memory or storage may include cloud storage. The term "or" may be construed as inclusive or exclusive. Plural instances described herein may be replaced with singular instances. Memory or storage may include any suitable structure (e.g., an active database, a relational database, a self-referential database, a table, a matrix, an array, a flat file, a documented-oriented storage system, a non-relational No-SQL system, and the like), and may be cloud-based or otherwise.

At least some of the operations of a method may be performed by the one or more hardware processors. The one or more hardware processors may operate partially or totally in a "cloud computing" environment or as a "software as a service" (SaaS). For example, some or all of the operations may be performed by a group of computers being accessible via a network (e.g., the Internet) and via one or more appropriate interfaces (e.g., one or more APIs).

The performance of certain of the operations may be distributed among various hardware processors, whether residing within a single machine or deployed across a number of machines. In some embodiments, the one or more hardware processors or engines may be located in a single geographic location (e.g., within a home environment, an office environment, or a server farm). In some embodiments, the one or more hardware processors or engines may be distributed across a number of geographic locations.

The foregoing description of the preferred embodiments of the present invention is by way of example only, and other variations and modifications of the above-described embodiments and methods are possible in light of the foregoing teaching. Although the network sites are being described as separate and distinct sites, one skilled in the art will recognize that these sites may be a part of an integral site, may each include portions of multiple sites, or may include combinations of single and multiple sites. The various embodiments set forth herein may be implemented utilizing hardware, software, or any desired combination thereof. For that matter, any type of logic may be utilized which is capable of implementing the various functionality set forth herein. Components may be implemented using a programmed general purpose digital computer, using application specific integrated circuits, or using a network of interconnected conventional components and circuits. Connections may be wired, wireless, modem, etc. The embodiments described herein are not intended to be exhaustive or limiting. The present invention is limited only by the following claims.

The invention claimed is:

1. A client device configured to assist in identifying user consumption of information, the client device comprising:
   one or more hardware processors;
   a screen configured to display screen images thereon;
   a storage device;
   memory storing computer instructions, the computer instructions when executed by the one or more hardware processors configured to perform:
      automatically capturing a series of screen image snapshots being presented on the screen;
      reducing a resolution of each screen image snapshot in the series of screen image snapshots to a reduced resolution;
      automatically capturing metadata associated with each screen image snapshot in the series of screen image snapshots, the metadata at least including a timestamp;
      identifying one or more duplicates in the series of screen image snapshots;
      discarding the one or more duplicates from the series of screen image snapshots to form a reduced series;
      modifying the metadata to identify the one or more duplicates discarded as having been discarded;

storing the reduced series of reduced-resolution screen image snapshots and the modified metadata in the storage device; and after detecting a trigger condition, uploading the reduced series of reduced-resolution screen image snapshots and the revised metadata over a computer network to a processing server configured to evaluate the reduced series of reduced-resolution screen image snapshots and the modified metadata to determine whether a user may have consumed a particular content item.

2. The client device of claim 1, wherein the reduced resolution is a predetermined resolution.

3. The client device of claim 1, wherein the reduced resolution is based on available storage in the storage device.

4. The client device of claim 1, wherein the instructions are configured to perform automatically capturing the series of screen image snapshots at a predetermined rate.

5. The client device of claim 4, wherein the predetermined rate is one screen image snapshot per second.

6. The client device of claim 1, wherein the instructions are configured to stop automatically capturing screen image snapshots when a battery goes below a threshold battery level.

7. The client device of claim 1, wherein the instructions are configured to stop automatically capturing screen image snapshots when available storage on the storage device exceeds a threshold storage value.

8. The client device of claim 1, wherein the instructions are configured to stop automatically capturing screen image snapshots in response to a user instruction.

9. The client device of claim 1, wherein the instructions are configured to stop automatically capturing screen image snapshots when the screen is off.

10. The client device of claim 1, wherein the instructions are configured to stop automatically capturing screen image snapshots when an electronic keyboard is active.

11. A processor-based method of capturing user consumption of information, the method comprising:

automatically capturing a series of screen image snapshots being presented on a screen of a client device;

reducing a resolution of each screen image snapshot in the series of screen image snapshots to a reduced resolution;

automatically capturing metadata associated with each screen image snapshot in the series of screen image snapshots, the metadata at least including a timestamp;

identifying one or more duplicates in the series of screen image snapshots;

discarding the one or more duplicates from the series of screen image snapshots to form a reduced series;

modifying the metadata to identify the one or more duplicates discarded as having been discarded;

storing the reduced series of reduced-resolution screen image snapshots and the modified metadata in a storage device; and after detecting a trigger condition, uploading the reduced series of reduced-resolution screen image snapshots and the revised metadata over a computer network to a processing server configured to evaluate the reduced series of reduced-resolution screen image snapshots and the modified metadata to determine whether a user may have consumed a particular content item.

12. The method of claim 11, wherein the reduced resolution is a predetermined resolution.

13. The method of claim 11, wherein the reduced resolution is based on available storage in the storage device.

14. The method of claim 11, wherein the automatically capturing the series of screen image snapshots includes automatically capturing the series of screen image snapshots at a predetermined rate.

15. The method of claim 14, wherein the predetermined rate is one screen image snapshot per second.

16. The method of claim 11, further comprising stopping automatically capturing screen image snapshots when a battery goes below a threshold battery level.

17. The method of claim 11, further comprising stopping automatically capturing screen image snapshots when available storage on the storage device exceeds a threshold storage value.

18. The method of claim 11, further comprising stopping automatically capturing screen image snapshots in response to a user instruction.

19. The method of claim 11, further comprising stopping automatically capturing screen image snapshots when the screen is off.

20. The method of claim 11, further comprising stopping automatically capturing screen image snapshots when an electronic keyboard is active.

* * * * *